United States Patent
Marino et al.

(10) Patent No.: US 7,653,006 B1
(45) Date of Patent: Jan. 26, 2010

(54) NETWORK TRAFFIC CAPTURE AND REPLAY WITH TRANSACTION INTEGRITY AND SCALING

(75) Inventors: Joseph A. Marino, Belchertown, MA (US); Patrick V. Johnstone, Westfield, MA (US)

(73) Assignee: Deja Vu Networks, Inc., Marlborough, MA (US)

( * ) Notice: Subject to any disclaimer, the term of this patent is extended or adjusted under 35 U.S.C. 154(b) by 139 days.

(21) Appl. No.: 12/046,966

(22) Filed: Mar. 12, 2008

Related U.S. Application Data

(60) Provisional application No. 60/894,417, filed on Mar. 12, 2007.

(51) Int. Cl.
*H04L 12/26* (2006.01)
(52) U.S. Cl. .................. 370/252; 709/223; 709/224
(58) Field of Classification Search .......... None
See application file for complete search history.

(56) References Cited

U.S. PATENT DOCUMENTS

| | | | |
|---|---|---|---|
| 2003/0145039 A1* | 7/2003 | Bonney et al. .......... 709/202 |
| 2003/0217144 A1* | 11/2003 | Fu et al. .......... 709/224 |
| 2004/0054715 A1* | 3/2004 | Cesario .......... 709/203 |
| 2004/0236866 A1* | 11/2004 | Dugatkin et al. .......... 709/235 |
| 2007/0189178 A1 | 8/2007 | Ottamalika |
| 2007/0248029 A1 | 10/2007 | Merkey |
| 2007/0276938 A1 | 11/2007 | Ottamalika |

* cited by examiner

*Primary Examiner*—Chirag G Shah
*Assistant Examiner*—Otis L Thompson, Jr.
(74) *Attorney, Agent, or Firm*—Jacobs & Kim LLP; David Jacobs

(57) ABSTRACT

Network traffic capture/replay systems, devices, apparatus, computer program code products and methods can include (1) extracting from the network traffic and scaling a plurality of sessions, (2) enabling asymmetrical scaling, wherein a client is cloned to generate a desired traffic load, (3) enabling complex scaling, wherein a captured packet may contain control sessions that control dependent sessions, wherein for each control session that is scaled, an additional stream session is scaled, (4) enabling traffic shaping, wherein the traffic shaping comprises parsing, categorizing and associating protocols associated with a packet capture file, and (5) enabling port mapping, wherein the port mapping comprises, prior to loading a packet capture file for replay, assigning source ports to each session.

3 Claims, 17 Drawing Sheets

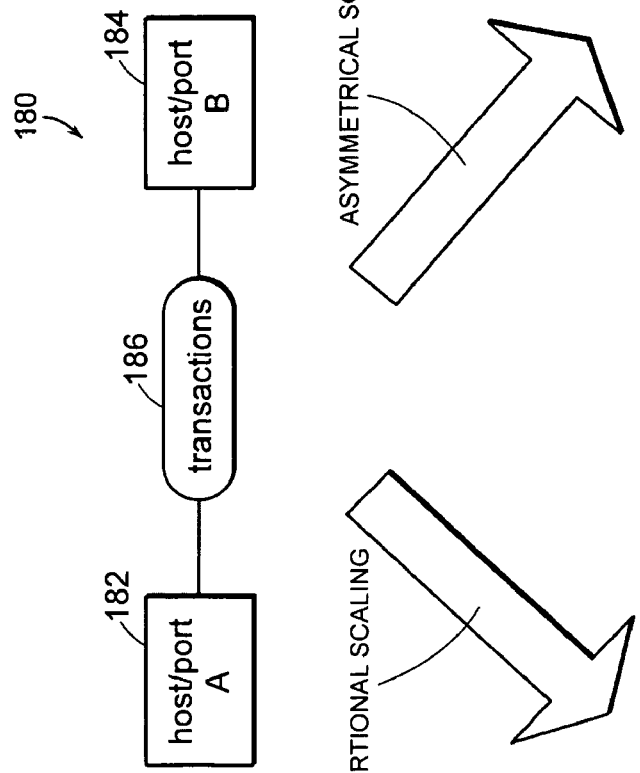
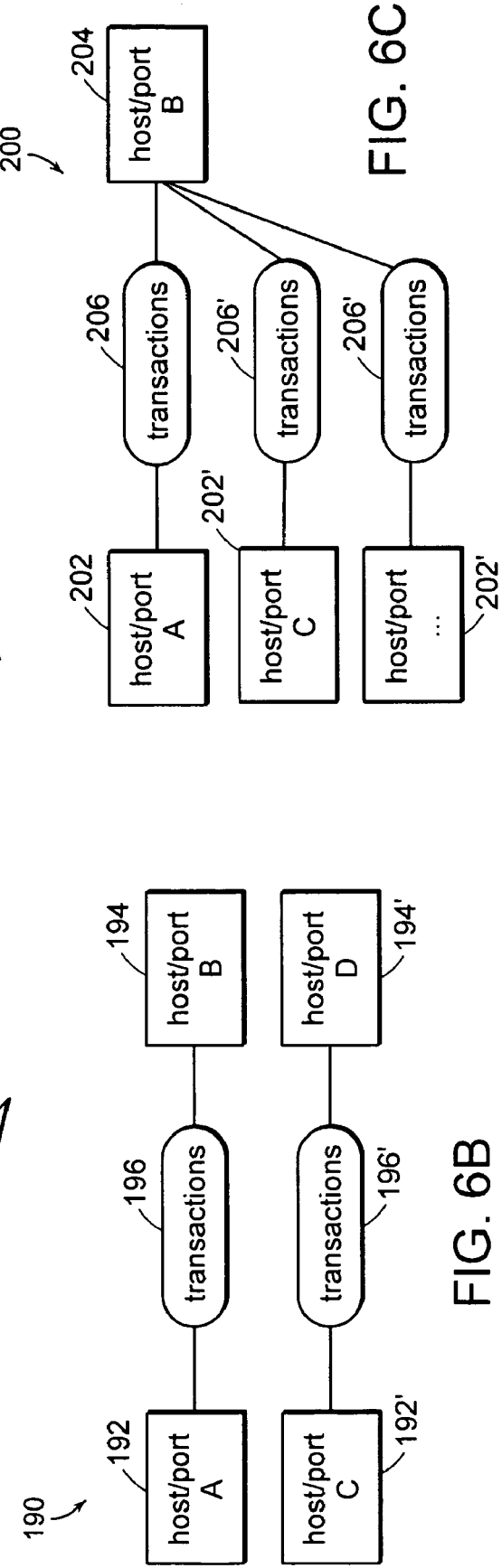

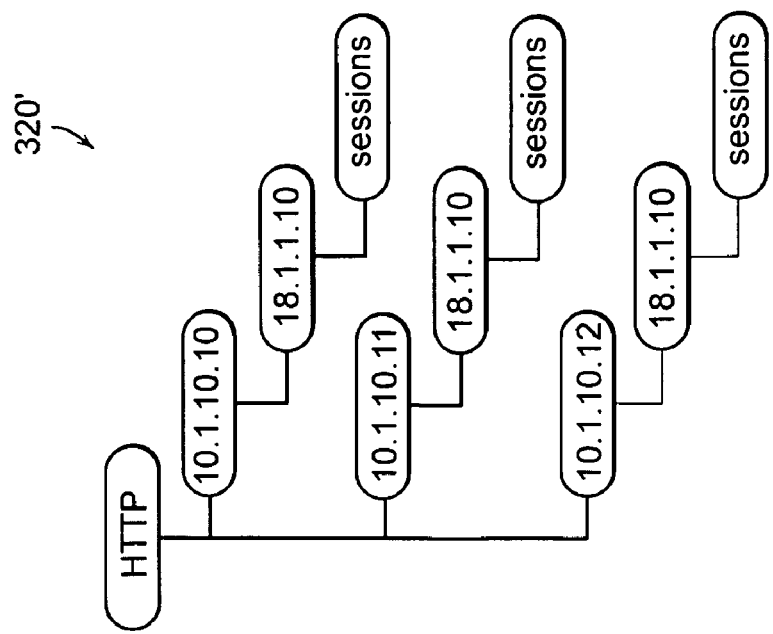
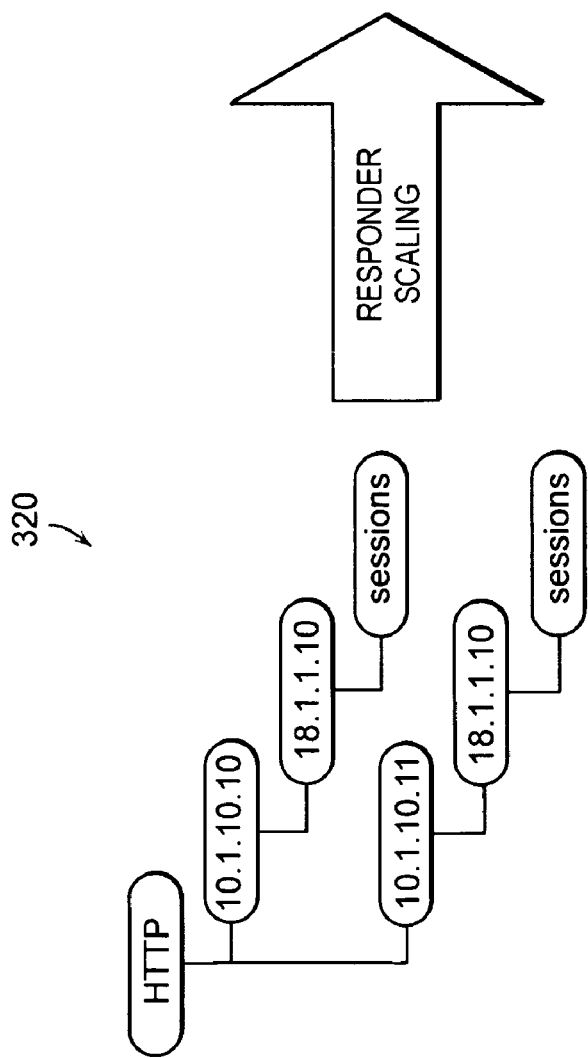

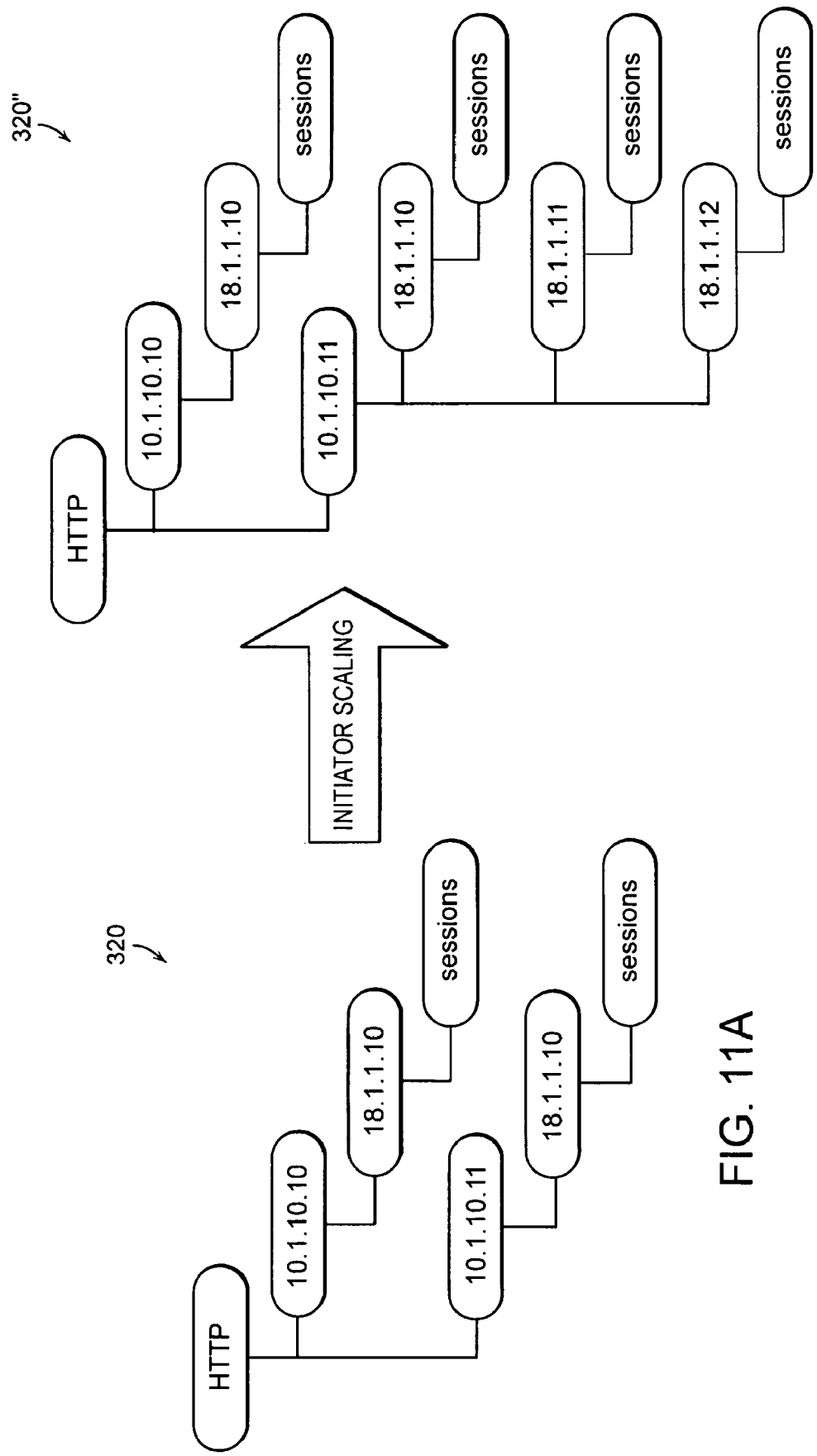

NETWORK TRAFFIC CAPTURE AND REPLAY WITH TRANSACTION INTEGRITY AND SCALING

CROSS-REFERENCE TO RELATED APPLICATIONS/INCORPORATION BY REFERENCE

This application for patent claims the priority benefit of U.S. Provisional Patent Application Ser. No. 60/894,417, filed Mar. 12, 2007.

FIELD OF THE INVENTION

The present invention relates generally to methods, systems, devices and software products for network protocol testing and, more particularly, to methods, systems, devices and software products operable to capture and replay network traffic with transaction integrity and scaling.

BACKGROUND OF THE INVENTION

Network equipment manufacturers and telecommunication companies rely upon load testing equipment to generate (OSI) layer 4-7 traffic. However, it is estimated that testing protocols offered by testing companies represent less than 15% of all protocols currently used over the Internet. For a number of reasons, both economical and functional, it is typically not feasible for testing equipment to generate more than a limited number of testing protocols.

First, in order to meet the needs of their customers, third-party network test vendors must bring testing products to market as soon as possible. However, it can be expensive and time-consuming to develop a testing protocol. It may take in excess of a year to deliver a testing protocol to the market. A lag time in delivery increases the possibility that a particular testing product will be obsolete, even before its initial release.

Furthermore, many, if not most, of the protocols currently in common use are proprietary, and were developed without a public RFC (Request for Comments). Some common examples of this type of protocol include Skype, iTunes, BitTorrent, and the like. Generally speaking, these proprietary protocols are impossible to replicate with standard programming techniques and cannot be offered by typical network testing vendors. There is a thus a significant need for third-party network testing equipment vendors to be able to provide a testing methodology that allows protocols to be generated instantaneously, whether open or proprietary, for network load testing.

In one current approach, raw network traffic is captured in a PCAP ("packet capture") file. PCAP is an open-source network-traffic capture library used by many BSD, Linux, and UNIX application. A PCAP file includes every network transaction that takes place between associated hosts/ports over a given period of time. These transactions are time-stamped with respective IP addresses, port addresses, and network routing attributes. After capture, a PCAP file can be "replayed" to attempt to reproduce the captured transactions.

Examples of conventional approaches are set forth in U.S. Patent Application Publication Nos. 2007/0248029 (Merkey et al.) and 2007/0276938 (Ottamalika et al.), each of which is incorporated by reference herein as if set forth in its entirety.

Using conventional techniques, it is possible to "clone" captured network transactions. Thus, the network load can be scaled upward by adding cloned transactions to a PCAP file prior to replay, thereby increasing the total number of transactions. However, as discussed in greater detail below, conventional techniques suffer from a number of drawbacks, particularly with respect to such issues as session content, session integrity and session scalability.

It would thus be desirable to provide methods, systems and computer program code products that allow the creation of a desired network testing load, while maintaining session content, session integrity and session scalability in their entireties.

SUMMARY OF THE INVENTION

The present invention meets these requirements, by providing improved network traffic capture/replay methods, systems, devices, apparatus and computer program code products that enable the maintenance of session content, session integrity and session scalability.

One aspect of the present invention relates to an improvement to a network traffic capture/replay system operable to capture, in packet capture files, network traffic between at least one initiator and at least one responder, wherein the network traffic comprises transactions and sessions, wherein the network traffic capture/replay system is further operable to scale or replay actual or simulated network traffic for load testing or other purposes, and wherein the replay can include replaying a packet capture file to attempt to reproduce captured transactions. In this aspect of the invention, the improvement includes extracting from the network traffic and scaling a plurality of sessions, while maintaining session integrity, session content, and session scalability to enable accurate replay. The invention can further includes enabling asymmetrical scaling, wherein a client is cloned to generate a desired traffic load, without cloning the server, such that a client portion of transactions can be scaled without cloning or scaling a server portion of transactions.

The invention can further include enabling complex scaling, wherein a captured packet may contain control sessions that control dependent sessions, wherein for each control session that is scaled, an additional stream session is scaled, and for each stream session that is scaled, an additional control session is scaled, such that when a complex session is scaled, a given interrelationship between a given control session and corresponding dependent sessions is preserved.

In another aspect, the invention can include enabling traffic shaping, wherein the traffic shaping comprises parsing, categorizing and associating protocols associated with a packet capture file. The categorizing can include multiple levels of categorization. A first level of categorization can correspond to protocols used in a given session or multiple sessions. A second level of categorization can correspond to sessions between initiator and responder host/ports. A third level of categorization corresponds to any dependent sessions controlled by a non-dependent session. The invention can also include utilizing categorization of contents of a packet capture file to enable decisions as to which sessions and which hosts/ports should be cloned for scaling for load testing purposes.

In another aspect of the invention, the scaling operation can include responder scaling. The scaling can also include initiator scaling.

In a further aspect of the invention, the categorization can include a payload packet inspection of an original packet capture file.

Another aspect of the present invention includes enabling port mapping, wherein the port mapping includes, prior to loading a packet capture file for replay, assigning source ports to each session, such that application source ports can be subsequently examined to determine which payloads are associated with a particular session, and such that each payload has its own port. In this aspect of the invention, when a given packet is replayed, source ports are matched.

It will be understood that in accordance with the present invention, cloning can be repeated as many times as necessary to create a desired network load.

Another aspect of the invention includes executing a packet capture inspection method that dissects and categorizes packet capture files into discrete entities for replaying traffic.

Another aspect of the invention includes executing a packet capture inspection method comprising a payload inspection to dissect and categorize related or dependent sessions.

A further aspect of the invention includes executing a packet capture loading method that scales specific entities based upon dissection and categorization techniques.

Another aspect of the invention includes executing a packet capture modification method that assigns unique source ports to initiators for transaction integrity and NAT compatibility.

Among other aspects, the invention can maintain the transactional integrity of captured traffic when replaying traffic.

Still another aspect of the invention relates to a method, executable in a network traffic capture/replay system operable to capture, in packet capture files, traffic between or among at least one initiator and at least one responder, wherein the network traffic comprises transactions and sessions, wherein the network traffic capture/replay system is further operable to scale or replay actual or simulated network traffic for load testing or other purposes, and wherein the replay can include replaying a packet capture file to attempt to reproduce captured transactions. In this aspect, the invention can include the following:

(1) extracting from the network traffic and scaling a plurality of sessions, while maintaining session integrity, session content, and session scalability to enable accurate replay, (2) enabling asymmetrical scaling, wherein a client is cloned to generate a desired traffic load, without cloning the server, such that a client portion of transactions can be scaled without cloning or scaling a server portion of transactions, (3) enabling complex scaling, wherein a captured packet may contain control sessions that control dependent sessions, wherein for each control session that is scaled, an additional stream session is scaled, and for each stream session that is scaled, an additional control session is scaled, such that when a complex session is scaled, a given interrelationship between a given control session and corresponding dependent sessions is preserved, (4) enabling traffic shaping, wherein the traffic shaping comprises parsing, categorizing and associating protocols associated with a packet capture file, and (5) enabling port mapping, wherein the port mapping comprises, prior to loading a packet capture file for replay, assigning source ports to each session, such that application source ports can be subsequently examined to determine which payloads are associated with a particular session, and such that each payload has its own port.

Another aspect of the invention relates to a network traffic capture/replay system operable to capture, in packet capture files, traffic between or among at least one initiator and at least one responder, wherein the network traffic comprises transactions and sessions, wherein the network traffic capture/replay system is further operable to scale or replay actual or simulated network traffic for load testing or other purposes, and wherein the replay can include replaying a packet capture file to attempt to reproduce captured transactions. In this aspect, the system can include the following:

(1) means for extracting from the network traffic and scaling a plurality of sessions, while maintaining session integrity, session content, and session scalability to enable accurate replay, (2) means for enabling asymmetrical scaling, wherein a client is cloned to generate a desired traffic load, without cloning the server, such that a client portion of transactions can be scaled without cloning or scaling a server portion of transactions, (3) means for enabling complex scaling, wherein a captured packet may contain control sessions that control dependent sessions, wherein for each control session that is scaled, an additional stream session is scaled, and for each stream session that is scaled, an additional control session is scaled, such that when a complex session is scaled, a given interrelationship between a given control session and corresponding dependent sessions is preserved, (4) means for enabling traffic shaping, wherein the traffic shaping comprises parsing, categorizing and associating protocols associated with a packet capture file, and (5) means for enabling port mapping, wherein the port mapping comprises, prior to loading a packet capture file for replay, assigning source ports to each session, such that application source ports can be subsequently examined to determine which payloads are associated with a particular session, and such that each payload has its own port.

The invention can also be embodied or practiced in the form of a computer program code product executable in a network traffic capture/replay system comprising at least one computer that is operable to capture, in packet capture files, traffic between or among at least one initiator and at least one responder, wherein the network traffic comprises transactions and sessions, wherein the network traffic capture/replay system is further operable to scale or replay actual or simulated network traffic for load testing or other purposes, and wherein the replay can include replaying a packet capture file to attempt to reproduce captured transactions, the computer program code product including computer-readable computer program code stored on a computer-readable medium. In this aspect, the computer program code product can include the following:

(1) computer program code means executable by the computer to enable the computer to extract from the network traffic and scaling a plurality of sessions, while maintaining session integrity, session content, and session scalability to enable accurate replay, (2) computer program code means for enabling the computer to execute asymmetrical scaling, wherein a client is cloned to generate a desired traffic load, without cloning the server, such that a client portion of transactions can be scaled without cloning or scaling a server portion of transactions, (3) computer program code means executable by the computer to enable the computer to execute complex scaling, wherein a captured packet may contain control sessions that control dependent sessions, wherein for each control session that is scaled, an additional stream session is scaled, and for each stream session that is scaled, an additional control session is scaled, such that when a complex session is scaled, a given interrelationship between a given control session and corresponding dependent sessions is preserved, (4) computer program code means executable by the computer to enable the computer to execute traffic shaping, wherein the traffic shaping comprises parsing, categorizing and associating protocols associated with a packet capture file, and (5) computer program code means executable by the computer to enable the computer to execute port mapping, wherein the port mapping comprises, prior to loading a packet capture file for replay, assigning source ports to each session, such that application source ports can be subsequently examined to determine which payloads are associated with a particular session, and such that each payload has its own port.

These and other aspects, examples, practices and embodiments of the invention will next be described in greater detail in the following Detailed Description of the Invention, in conjunction with the attached drawing figures.

BRIEF DESCRIPTION OF THE DRAWINGS

FIGS. 6A-C are a series of diagrams contrasting a proportional scaling technique according to the prior art and an asymmetrical scaling technique according to a further aspect of the present invention.

FIGS. 10A and 10B are a pair of diagrams illustrating a responder scaling technique according to an aspect of the invention.

FIGS. 11A and 11B are a pair of diagrams illustrating an initiator scaling technique according to a further aspect of the invention.

DETAILED DESCRIPTION OF THE INVENTION

The present invention provides improved network traffic capture and replay methods, systems and computer program code products that enable session content, session integrity and session scalability to be maintained in their entireties. The combination of transaction integrity and transaction scaling provides significant technical advantages in capture replay methodologies for network load testing.

FIGS. 1-4 and the following introductory section provide a general framework for understanding aspects of the present invention, and are followed by more detailed drawings and discussion. It should be noted that although the present invention is described with respect to PCAP files, it will be appreciated that the invention may also be practiced with other types of network capture data. It should further be noted that aspects of the present invention may be practiced with actual and/or simulated network traffic between actual or simulated initiators and responders.

INTRODUCTION

Figure 1:
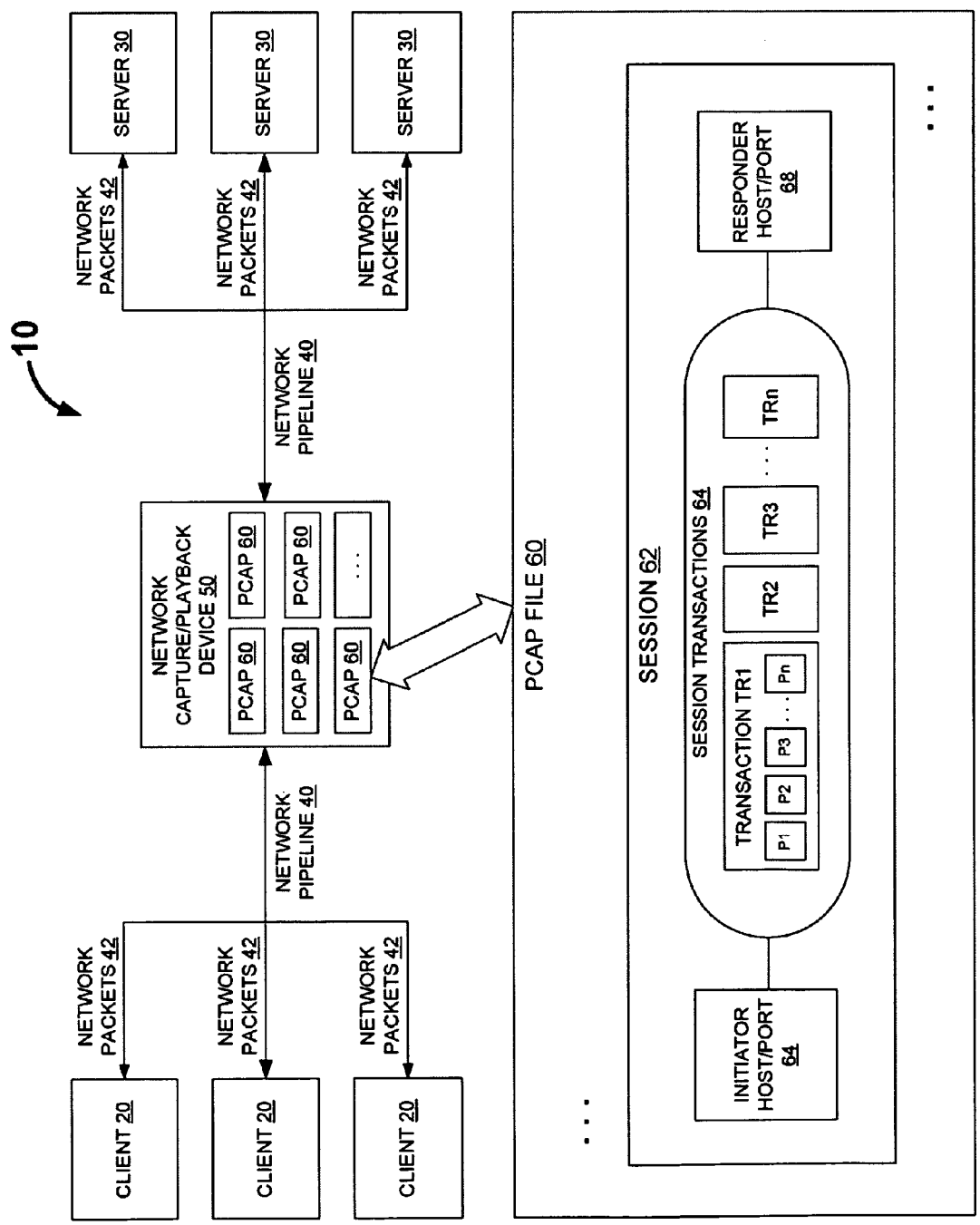
FIG. 1 is a diagram illustrating a PCAP file capture/replay system.

FIG. 1 is a simplified diagram of an exemplary test network 10, including a plurality of clients 20 and a plurality of servers 30 that are connected to each other over the Internet via a suitable network pipeline 40. The clients 20 and servers 30 transmit network packets 42 to each other. In addition to its payload data, each packet 42 includes a number of "administrative" layers that provide the necessary information and protocols for making sure that the packet is properly delivered to the correct addressee. When a packet reaches its host computer destination, the administrative layers are stripped away and the payload data is then available for use by the host computer.

As further illustrated in FIG. 1, a network capture/playback device 50 has been connected into the network pipeline 40. The network capture/playback device 50 allows network traffic to pass through, while capturing into a PCAP file 60 every network transaction that takes place over a given period of time. As mentioned above, the captured transactions are timestamped with respective IP addresses, port addresses, and network routing attributes.

At the bottom of FIG. 1 is a simplified diagram of the structure of a PCAP file 60. Generally speaking, a PCAP comprises a series of sessions 62. As used herein, a "session" generally refers to a connection between an initiator host or port 64 and a responder host or port 66 using the session layer of a network protocol. Sessions 62 may overlap each other over time. In other words, a core processor may execute transactions for multiple sessions at the same time.

In an actual network (in contrast to simulation by capture and replay), the use of "content-aware" protocols allows these overlapping transactions to be sorted out so that each session maintains its integrity, i.e., its distinct, separate identity, from the other sessions, thereby ensuring that network packets are transmitted to the correct recipient.

However, current capture and replay technology is not content-aware. Thus, current systems typically are not able to sort out overlapping sessions. As discussed below, an aspect of the present invention provides a technique that overcomes this limitation and allows the correct replay of overlapping sessions, even where the initiator and responder host/ports are content-unaware.

A session 62 comprises a series of session transactions 64, individually referred to as transactions TR1, TR2, TR3, . . . TRn. As used herein, the term "transaction" generally refers to an exchange of information between an initiator host/port 64 and a responder host/port 66. As illustrated with respect to transaction TR1, each transaction comprises a series of transmitted network packets P1, P2, P3, . . . Pn, and typically includes several phases, including a request and a response, as well as the transmission of payload data. As described in further detail below, certain sessions, referred to herein as "control sessions," control the creation and destruction of other sessions, referred to herein as "dependent sessions."

Once network traffic has been captured in a PCAP file, the PCAP file can be subjected to detailed examination and analysis, which may be performed across multiple PCAP files 60. This detailed examination and analysis may include, for example, the hierarchical categorization scheme set forth in FIG. 8, discussed below.

Figure 2:
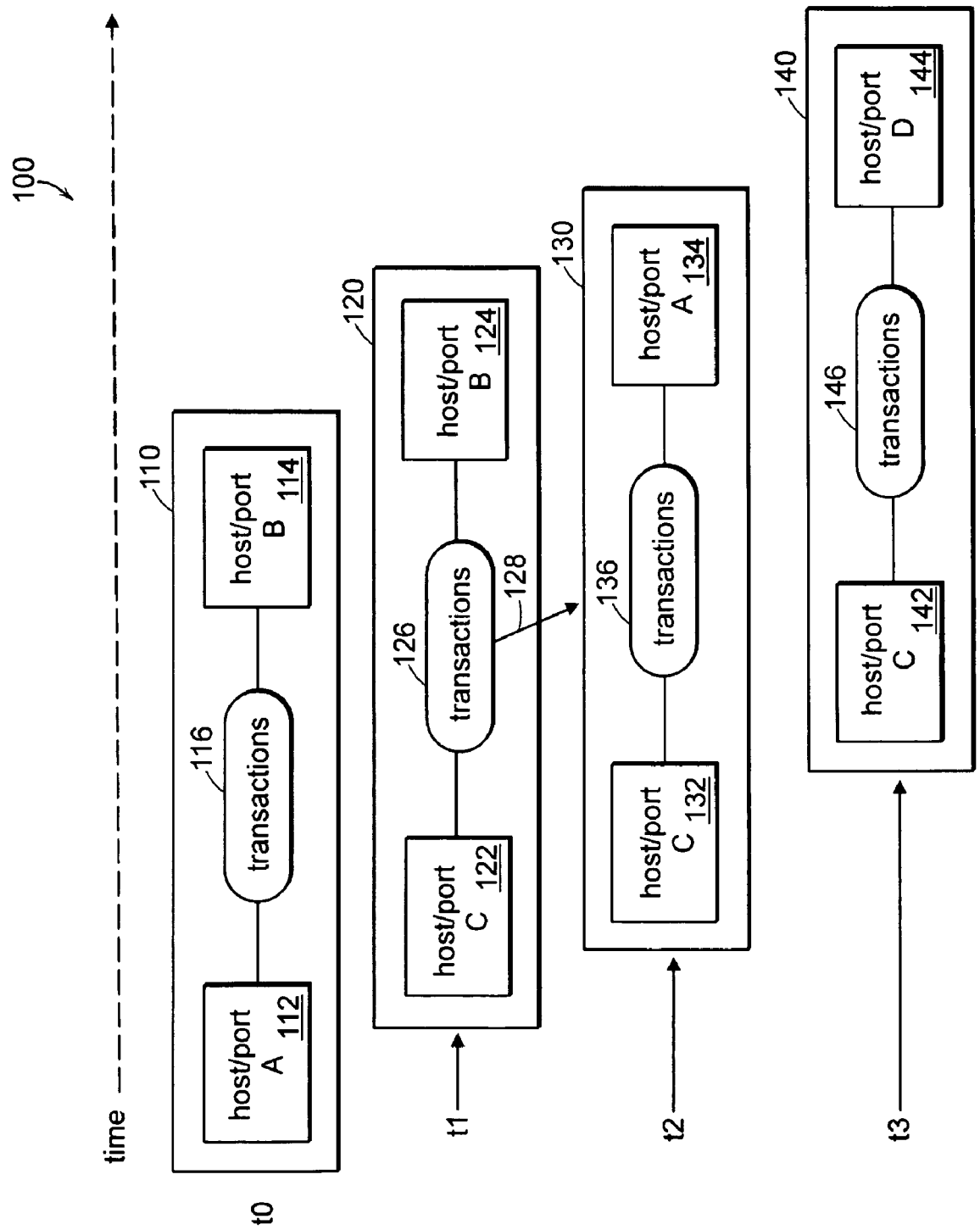
FIG. 2 is a diagram illustrating multiple overlapping sessions among a plurality of hosts/ports.

FIG. 2 shows a simplified representation of a portion of a PCAP file 100, comprising four distinct Transmission Control Protocol (TCP) sessions 110, 120, 130 and 140, that start at discrete times t0, t1, t2, and t3. Each TCP session includes an initiator host/port 112, 122, 132, and 142, a responder host/post 114, 124, 134, and 144, and session transactions 116, 126, 136, and 146 negotiated between the initiator and responder. For the purposes of the present discussion, each session is identified by its initiator and responder. Thus, session 110 is referred to as "session AB," session 120 is referred to as "session CB," session 130 is referred to as "session CA," and session 140 is referred to as "session CD."

It will be seen that a single host/port may participate in multiple sessions. Thus, for example, host/port C acts an initiator in session CB 120, session CA 130, and session CD. Also, a host/port may act as an initiator in one session, but as a responder in another. Thus, for example, host/port A acts an initiator in session AB 110, but as a responder in session CA 130.

Current capture-replay technologies can take any one of the discrete sessions, transpose or otherwise modify networking attributes, i.e., IP addresses, gateways, MAC addresses, and the like, and replay that session. Current technologies further have the ability to clone thousands of exact instances of a single session to scale the load. However, current technologies are focused on extracting a single session from a PCAP file and scaling that session, and are typically ill-equipped to extracting and scaling multiple, overlapping sessions.

There are a number of reasons for these limitations, relating to transaction integrity and transaction scale. One reason that single-session technology cannot be used to scale multiple sessions is that single-session technology makes no provision for replaying multiple sessions having relative timing. For example, in FIG. 2, session AB starts at time t0, session CB starts at time t0+t1, session CA starts at time t0+t2, and session CD starts at time t0+t3.

Current test networks and network testing technologies implement protocols in an RFC-compliant manner, which requires that the protocols be fully "content-aware." The use of content-aware protocols allows the packets transmitted during multiple overlapping sessions to be sorted out based upon the content of the packets being transmitted. However, capture-replay technology, which needs to accurately replay each session exactly as it was captured, is not content-aware. Thus, content-aware protocols are problematic with respect to current systems and techniques for capturing and replaying network traffic for network testing.

During replay of overlapping sessions, capture-replay technology executes each transaction sequentially. Because capture-replay technology is not content-aware, it has no way to sort out which transactions belong to which sessions. Thus, current technologies cannot maintain the integrity of multiple, overlapping sessions in a single PCAP file or across multiple PCAP files, where the captured traffic was originally transferred using content-aware protocols. A loss of integrity means that during replay packets may be directed to incorrect recipients, leading to errors and failures in the testing network.

Further, as indicated by arrow 128, session CB controls the instantiation and destruction of session CA. If session CB is scaled without regard to session CA, then the replay traffic would be inaccurate and rejected by network devices. The same holds true in the reverse situation, i.e., if session CA is scaled without regard to session CB. This session relationship is representative of many protocols that have one session (i.e., a "control session") that governs a secondary streaming session (i.e., a "dependent session"). The following are examples of protocols that have this characteristic: FTP; VoIP SIP; VoIP H323; BitTorrent; IPTV; Gaming; SlingBox; Skype; and Instant Messaging.

Figure 3:
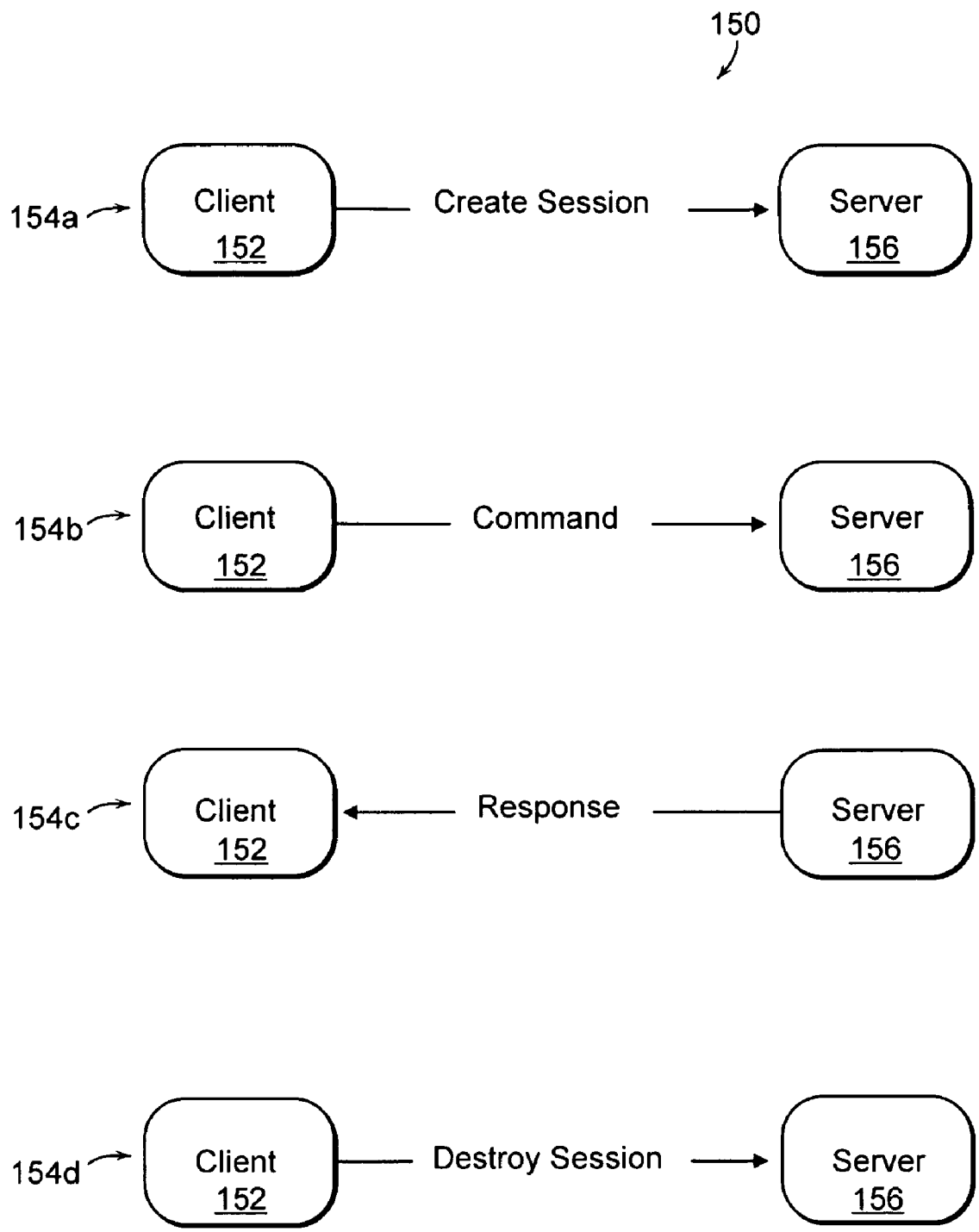
FIG. 3 is a diagram illustrating a typical HTTP session between a client and a server.

FIG. 3 is a simplified diagram of an exemplary HTTP session 150 implemented by a network testing vendor. In the present example, a client 152 initiates a series of four transactions 154a-d with a server 156. In the first transaction 154a, the HTTP session is commenced by creating a TCP connection. In the second transaction 154b, the client 152 issues a command to the server 156. In the third transaction 154c, the server 156 issues a response to the client 152. Finally, in the fourth transaction 154d, the HTTP session is terminated by destroying the TCP connection.

In this type of session, the transactions are anonymous. At each step, prior to receiving a request, the client or server has no knowledge or awareness as to the host/server making the request. Thus, in exemplary session 150, the server 156 would create the session based upon an anonymous request from any client 152, respond to any command, and destroy the session once the commands have been completed or timed out. Anonymity is possible because the relevant protocols are aware of the content of the payload.

The situation is reversed with respect to capture-replay technology. When a captured session is replayed, the hosts are completely aware of each other. The client is aware of the server to which any payloads are to be sent, and the server is aware of the client to which any payloads are to be sent. However, capture-replay technology is "content-unaware" and transacts the payloads in a strictly sequential manner.

Figure 4:
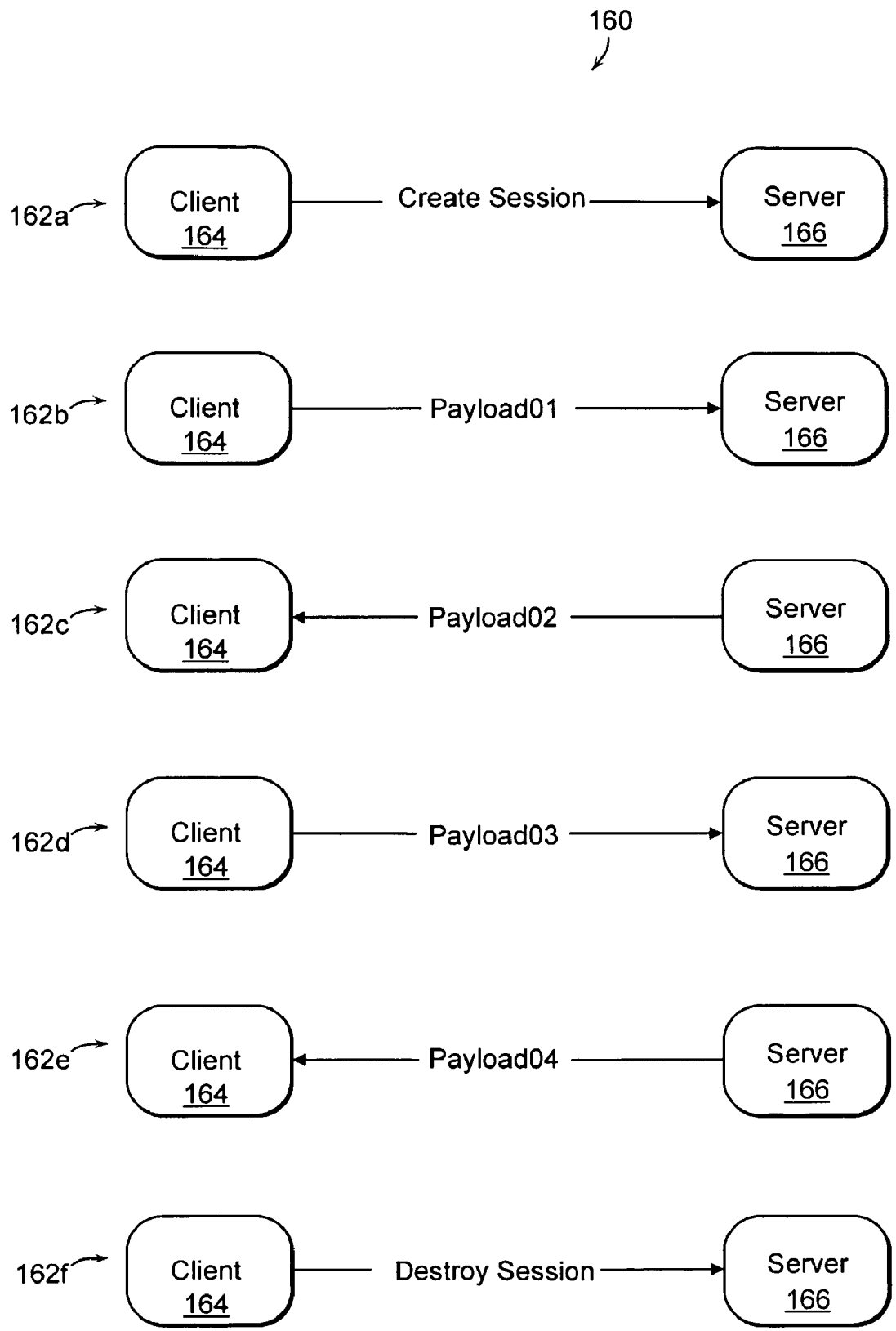
FIG. 4 is a diagram illustrating the replay of a captured session between a client and a server.

FIG. 4 is a diagram illustrating the coordination of transacted payloads for a single session replay 160 of a series of six transactions 162a-f between a client 164 and a server 166. The replay 160 uses a common configuration file that maintains a sequential list of transacted payloads. In the first transaction 162a, a session is created. In the next four transactions 162b-e, Payloads 01-04 are sent back and forth between the client 164 and server 166. In the final transaction, the session is destroyed.

In a multiple session capture-replay file, a separate configuration of payloads would have to be maintained for each individual session to make sure that the payloads all go to the right place. When there is only one session being replayed, it is easy to determine what data to send and what data to reply with. However when there are multiple sessions, it is problematic, without content knowledge, to associate senders and responders, i.e., to determine who should talk to whom.

Figure 5:
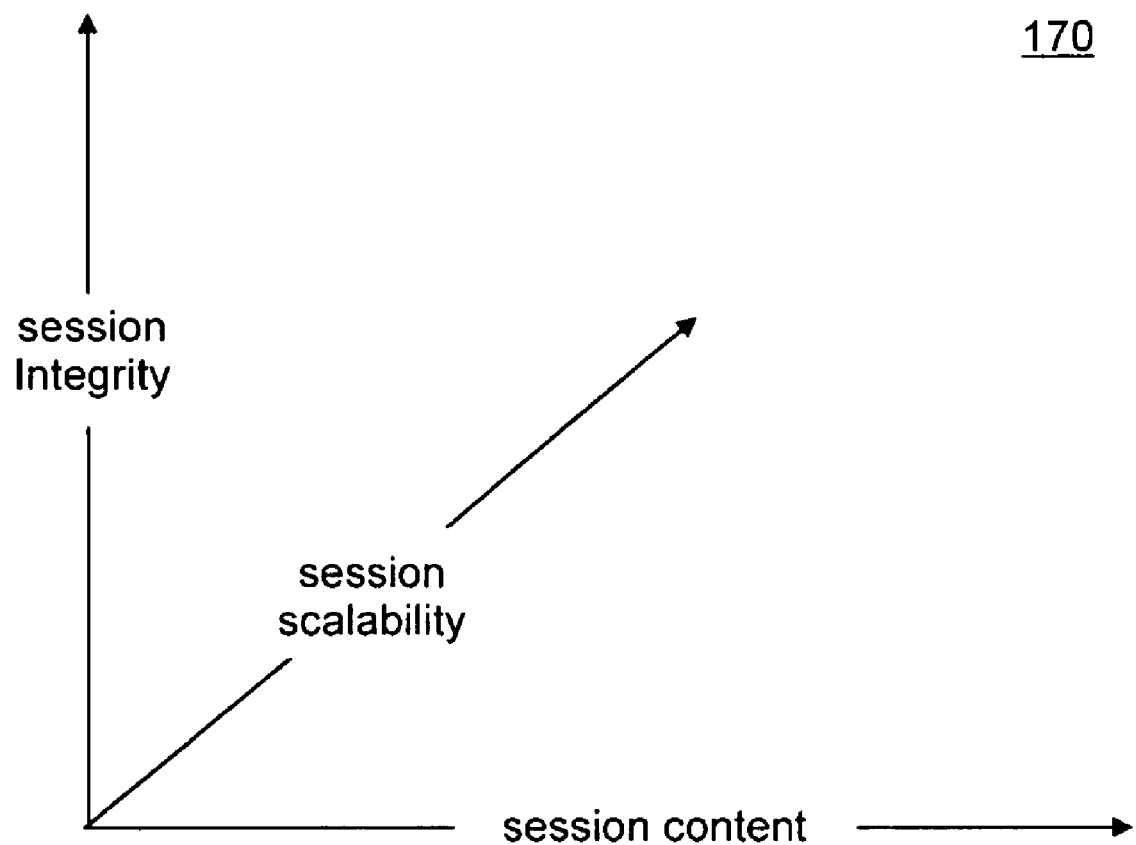
FIG. 5 is a diagram illustrating the proportional relationship between session scalability, session integrity, and session content.

In accordance with the above discussion, it will be appreciated that in order to replay a PCAP file accurately for network testing, three conditions must be maintained: session integrity, session content, and session scalability. FIG. 5 is a graph 170 illustrating the interrelationship of these conditions. As shown in FIG. 5, session integrity and session content must be scaled proportionately.

If four sessions are replayed, as shown in FIG. 2, the sessions must all start at the offset t0 in the original PCAP file and replay the appropriate payload sequences. However, appropriate session scaling requires an intrinsic knowledge and understanding of the sessions to be scaled.

The present invention includes the following aspects:
1. Asymmetrical Scaling
2. Complex Scaling
3. Traffic Shaping
4. Port Mapping Each of these aspects is discussed in turn below, followed by Section 5, which sets forth a general technique according to described aspects of the invention, and Section 6, which discusses digital processing environments in which aspects of the invention may be practiced.

1. Asymmetrical Scaling

Consider the HTTP transaction 180 of FIG. 6A, in which a single client (host/port A) 182 and a single server (host/port B) 184 conduct a simple transaction 186. For the purposes of the present discussion, it is assumed that the transaction 186 has been captured in a PCAP file, and that it is desired to scale this transaction 180 for network testing purposes.

At first blush, it might appear that suitable scaling may be achieved simply by scaling the sessions proportionately. However, scaling the sessions by increasing them proportionately does not always result in the desired effect. FIG. 6B shows a diagram of a scaled session 190, in which the session 180 shown in FIG. 6A has been doubled in its entirety, producing two client-server pairs: (1) host/port A 192 and host/port B; and (2) host/port C 192' and host/port D 194' conducting corresponding transactions 196 and 196'.

However, it would be more realistic, and therefore more useful, to scale the session such that a single HTTP server handles multiple clients. In this particular example, a network testing solution requires asymmetrical cloning, in which the client is cloned to generate a desired traffic load (host/port A, host/port C, etc.), without cloning the server (host/port B). Asymmetrical cloning enables the client portion of the transactions to be scaled while maintaining a single server.

FIG. 6 shows a diagram of a scaled session 200, in which the session 180 shown in FIG. 6A has been scaled in accordance with an aspect of the present invention. As shown in FIG. 6C, has been scaled such that the client host/port 202 and transactions 206 have been cloned to add host/ports 202' and transactions 206'. However, the added transactions 206' are all conducted with server host/port 204, which is not cloned.

2. Complex Scaling

A PCAP file may contain more complex structures. For example, a captured packet may include sessions ("control sessions") that control other sessions ("stream sessions" or "dependent sessions") in the packet. In FIG. 2, session CB is a session of this type. Where a PCAP has a complex structure, the scaling technique must be equally complex. That is, for each control session that is scaled, an additional stream session must be scaled. The reverse is true, i.e., for each stream session that is scaled, an additional control session must also be scaled.

Figure 7B:
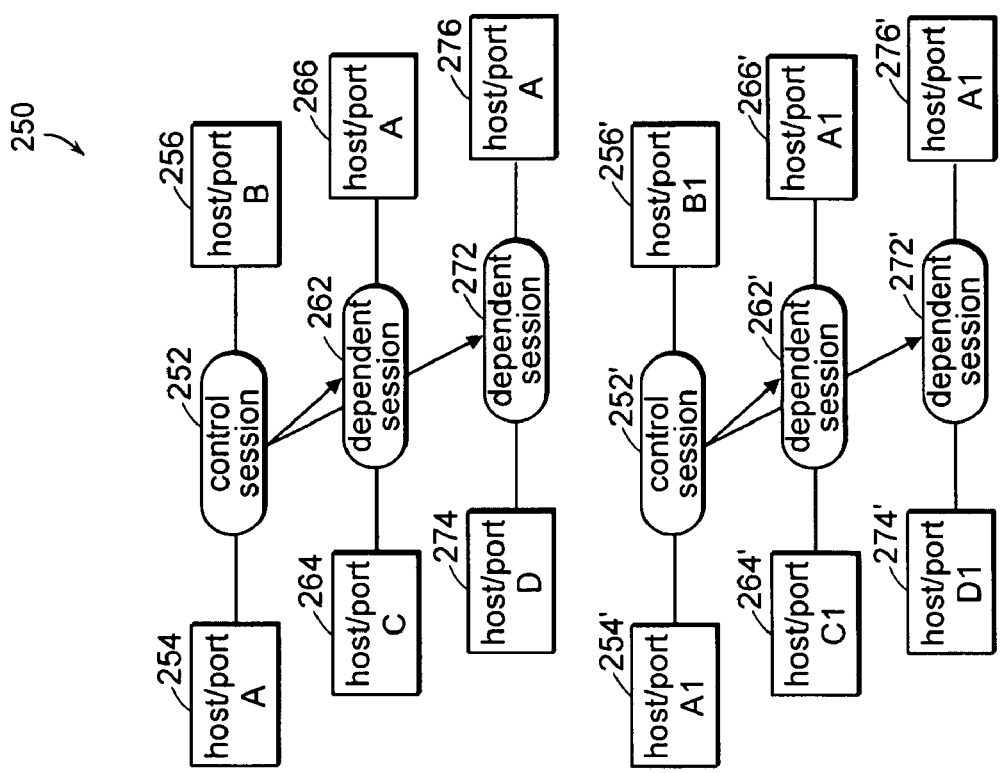
FIGS. 7A-B are a pair of diagrams illustrating the scaling of a complex session according to a further aspect of the invention.
Figure 7A:
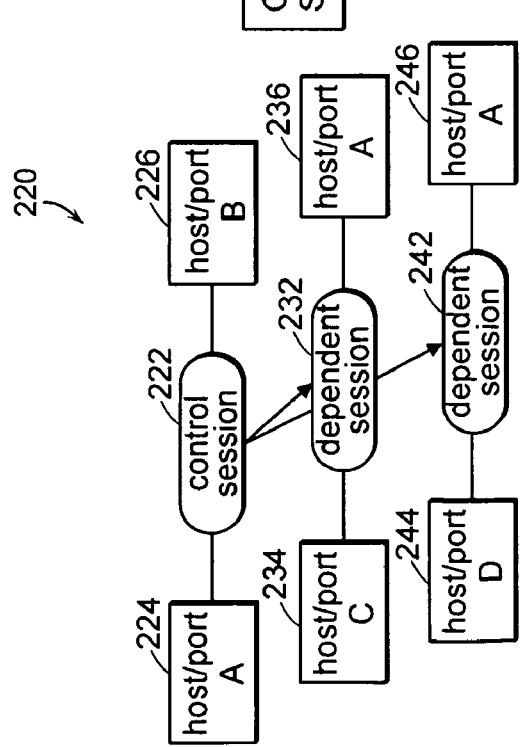

FIG. 7A is a diagram of a complex session 220, including a control session AB 222, and two dependent sessions CA 232 and DA 242. Control session AB 222 is conducted between host/port A 224 and host/port B 226. Dependent session CA 232 is conducted between host/port C 234 and host/port A 236. Dependent session 242 is conducted between host/port 244 and host/port A 246.

As discussed above, when complex session 220 is scaled, it is necessary to preserve the interrelationship between control session AB 222 and dependent sessions CA 232 and DA 242. FIG. 7B shows the scaled session 250 resulting from the scaling of complex session 220. The upper half of the scaled session 250 shows a control session AB 252 between host/port A 254 and host/port B 256; a first dependent session CA 262 between host/port C 264 and host/port A 266; and a second dependent session DA 272 between host/port D 274 and host/port A 276.

The lower half of the scaled session 250 is a clone of the upper half of the scaled session, preserving the interrelationship between the control session 252 and the two dependent sessions 262 and 272. Thus, the lower half shows a control session A1-B1 252' between host/port A1 254' and host/port B1 256; a first dependent session C1-A1 262' between host/port C1 264' and host/port A1266'; and a second dependent session D1-A1 272' between host/port D1 274' and host/port A1 276'. This cloning may be repeated as many times as necessary to create a desired network load.

3. Traffic Shaping

Figure 8:
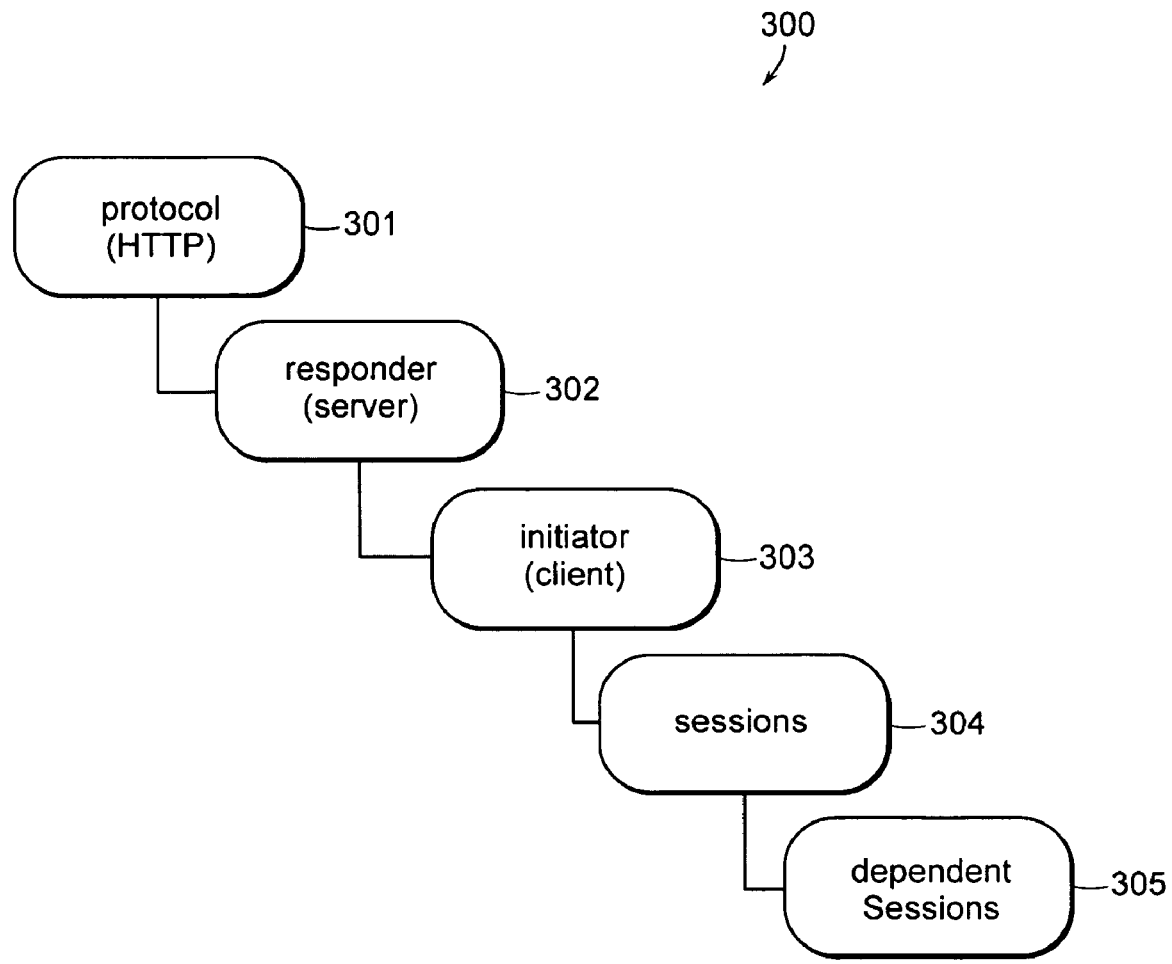
FIG. 8 is a diagram illustrating a hierarchical categorization scheme used to sort a PCAP file prior to scaling according to a further aspect of the invention.

The ability to scale captured traffic correctly is a derivative of parsing, categorization, and associating protocols within a PCAP file. FIG. 8 shows a diagram of a categorization scheme 300 according to a further aspect of the invention. As shown in FIG. 8, the components of a PCAP file are hierarchically categorized. The highest level of categorization is the protocol used 301 (such as HTTP). For each protocol, there are a number of responder host/ports 302 (e.g., an HTTP server). Each responder host/port 303 responds to an initiator (e.g., an HTTP client). The next level of categorization is the sessions (non-dependent) 304 between the initiator 303 and responder 302. The lowest level of categorization is any dependent sessions controlled by a non-dependent session 304.

The categorization of the contents of the PCAP file provides a useful scheme for intelligently deciding which sessions and which host/ports should be cloned for load testing purposes.

Figure 9:
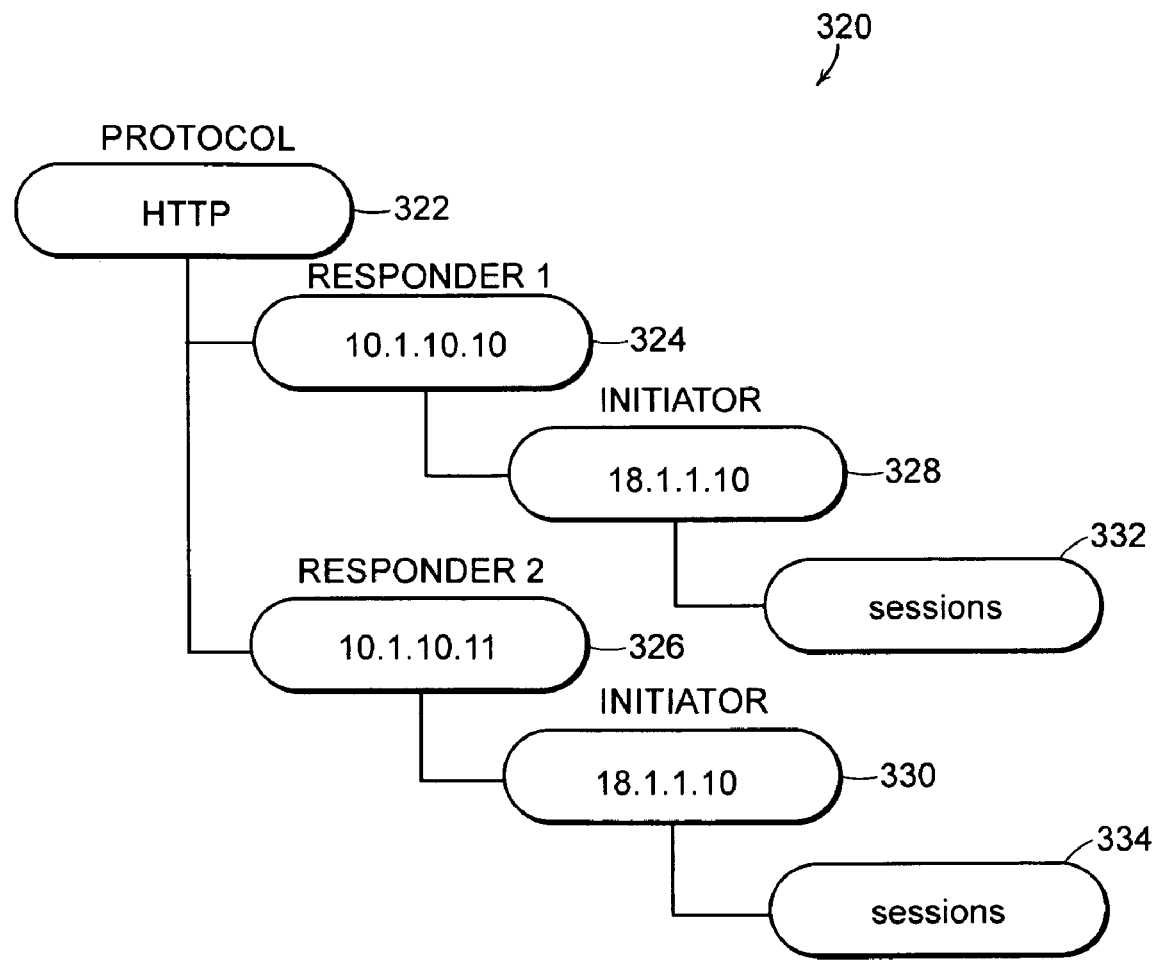
FIG. 9 shows a diagram of a typical HTTP session categorized according to the scheme shown in FIG. 8.

FIG. 9 is a diagram of a simple Hypertext Transfer Protocol (HTTP) session 320, in which an initiator client 328 (18.1.1.10) has accessed two different responder web sites (10.1.10.10 and 10.1.10.11). Referring to FIG. 8, the protocol categorization (HTTP) is determined by the destination port of all requesting clients, i.e., the originators. In this example, the PCAP contained one initiator, 18.1.1.10, requesting connections on port 80 from two different servers, 10.1.10.10 and 10.1.10.11.

The sessions contain the packet payloads that were transacted between the initiator-responder pairs, i.e., a first set of transactions between client 18.1.1.10 and server 10.1.10.10, and a second set of transactions between client 18.1.1.10 and server 10.1.10.11. There may be one session or multiple sessions for each initiator-responder pair. For example, a single user may have requested two different web pages from the same server. In this example, no payload inspection is required to categorize the PCAP file.

Applying the scheme shown in FIG. 8, the session components are categorized as follows:

Protocol: HTTP

Responders: 10.1.10.10, 10.1.10.11

Initiator: 18.1.1.10

Sessions: The body of transactions between 18.1.1.10 and 10.1.10.10 and between 18.1.1.10 and 10.1.1.11

Formatting the PCAP file contents in this way provides a useful framework for scaling the PCAP file for load testing. Any responder and any initiator can be readily scaled by a factor of 1 to n, while preserving session integrity and session content.

FIGS. 10A-B are a pair of diagrams illustrating "responder scaling" according to an aspect of the invention. In FIG. 10A, the HTTP session 320 shown in FIG. 9 has been reproduced for convenient reference. It will be seen that each component in the categorization scheme can be viewed as a node in a tree, and that each initiator and responder defines one or more branches of the tree. FIG. 10B shows the scaled session 320', in which the branch defined by responder 10.1.10.11 has been cloned to form an added branch including cloned responder 10.1.10.12, initiator 18.1.1.10, and sessions therebetween. Thus, in FIGS. 10A and 10B, the responding server 10.1.10.11 has been scaled by a factor of two.

FIGS. 11A and 11B are a pair of diagrams illustrating "initiator scaling" according to a further aspect of the invention. In FIG. 11A, the HTTP session 320 shown in FIG. 9 has been reproduced for convenient reference. FIG. 11B shows the scaled session 320", in which the lower branch defined by initiator 18.1.1.10 and its associated sessions have been cloned to form two additional branches defined by cloned initiators 18.1.1.1.1 and 18.1.1.12, and their cloned associated sessions. Thus, in FIGS. 11A and 11B, the lower branch defined by initiator 18.1.1.10 has been scaled by a factor of three.

Figure 12:
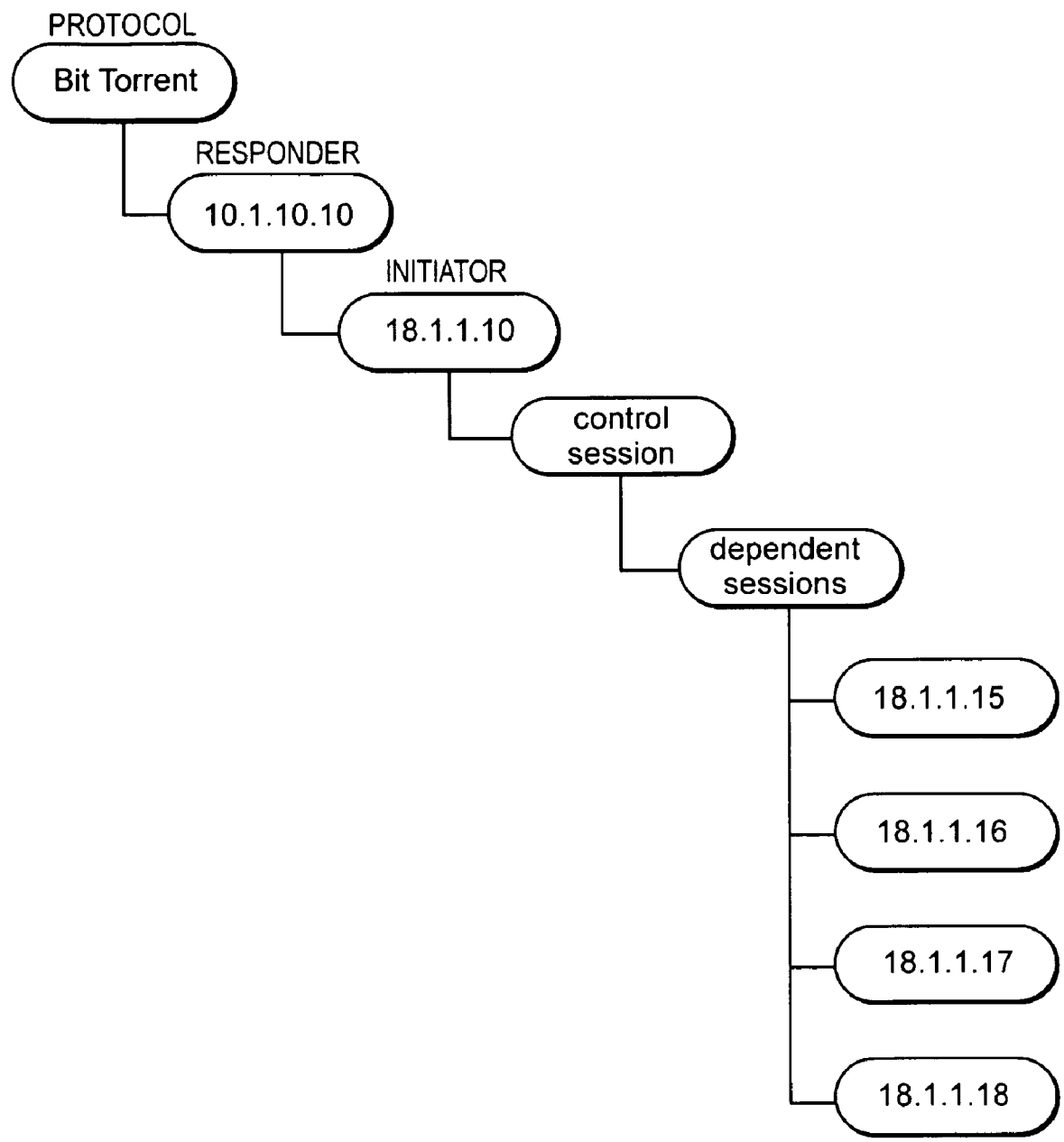
FIGS. 12 and 13 are a pair of diagrams illustrating the categorization and scaling of a complex session according to a further aspect of the invention.

Complex scaling requires deeper packet inspection. Protocols that have control sessions and dependent streams such as VoIP or BitTorrent are more complex to categorize, although the scaling rules stay the same. FIG. 12 shows an example of a categorized BitTorrent PCAP file 340. In the example of FIG. 12, there is one control 342 session that has dependent sessions 344 that use ports 18.1.1.15-18.

In this example, the described categorization requires a payload packet inspection of the original PCAP file. Intrinsic protocol knowledge must be contained in the packet inspector to categorize dependent sessions correctly.

Figure 13:
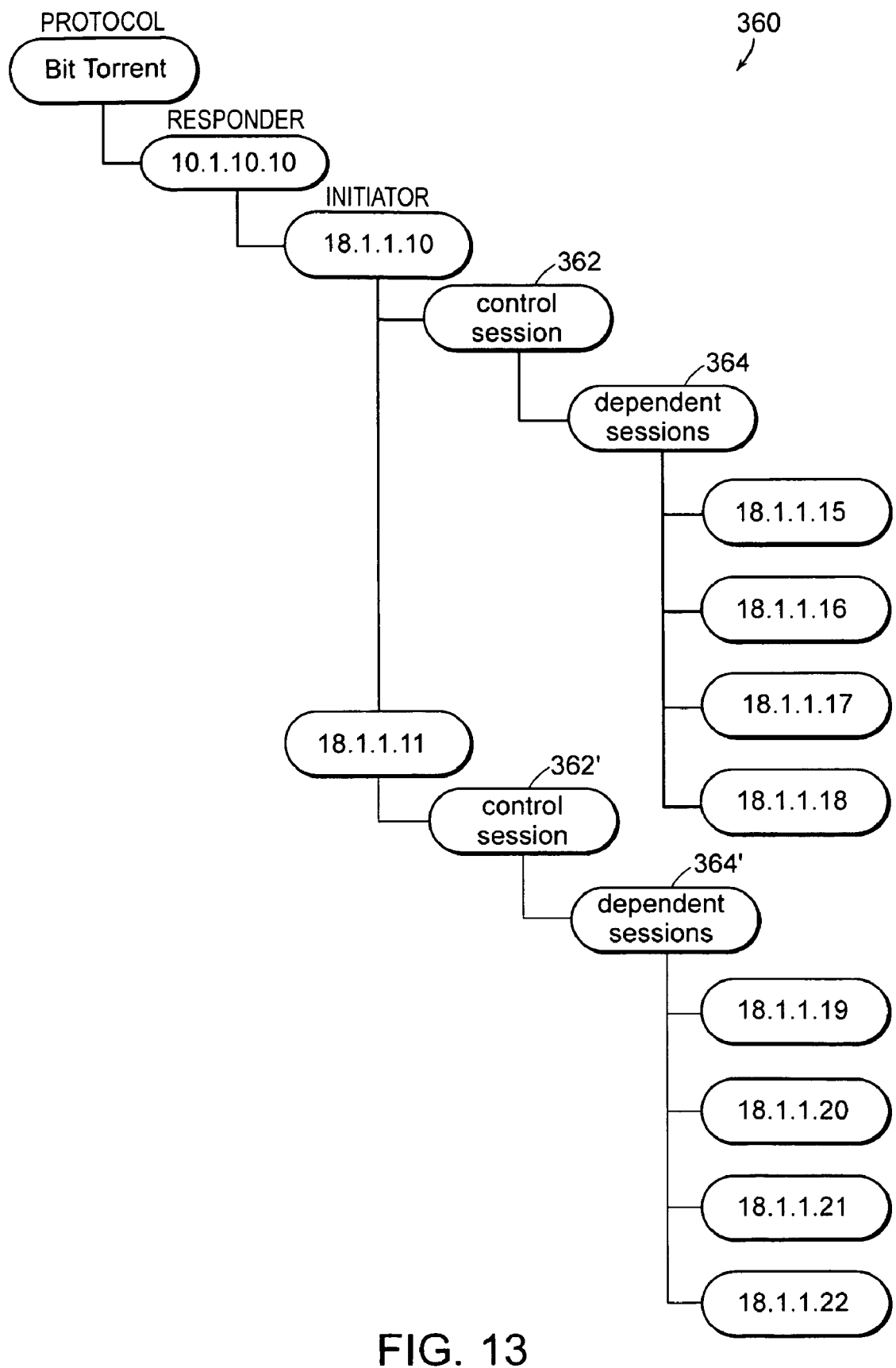

Protocols with dependent sessions can be scaled by either factoring the responder or factoring the initiator. FIG. 13 shows a diagram of a scaling operation in which the initiator 18.1.1.11 has been cloned to scale the captured traffic by a factor of two. In order to preserve the relationship between control session 362 and dependent sessions 364, these sessions have also been cloned to create control session 362' and dependent sessions 364', which use host/ports 18.1.1.19-22.

From FIGS. 12 and 13, it will be seen that the described categorization scheme preserves the integrity of complex sessions by preventing control sessions and their associated dependent sessions from being cloned separately from each other.

4. Port Mapping

As mentioned above, prior to a given client-server transaction, the hosts are aware of each other, and negotiate the transaction accordingly. The client is aware of the payload(s) to be sent to the server and the server is aware of the payload(s) to be sent to the client.

As discussed above, a PCAP file captures, in raw form, all of the network transactions between hosts, i.e., between clients and servers. Capture-replay technology allows these network transactions to be reproduced. However, capture-replay technology is not content-aware, and transacts the payloads in a strictly sequential manner, irrespective of content.

Figure 14:
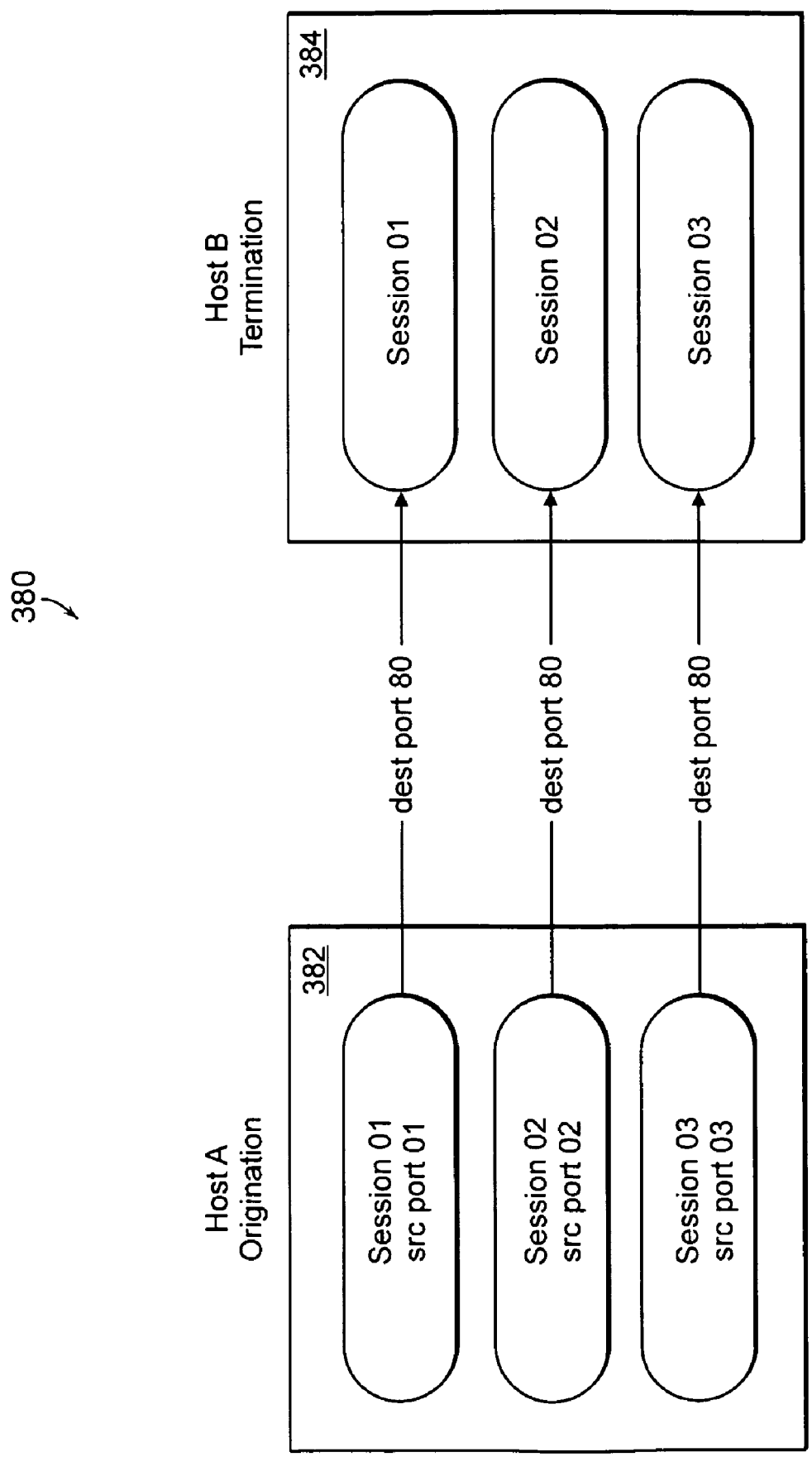
FIG. 14 is a diagram illustrating a port mapping technique according to a further aspect of the invention.

Replaying multiple captured sessions simultaneously creates additional problems in maintaining transaction integrity. FIG. 14 is a diagram of an origination host 382, referred to as "Host A" and a termination host 384, referred to as "Host B." In the present example, it is desired to capture and replay three application sessions, i.e., Sessions 01, 02 and 03 between Host A and Host B. In the present example, it is assumed that the three applications talk over port 80 between Host A and Host B. The origination host, i.e., Host A, makes three connections to the termination host, i.e., Host B. However, as discussed above, during a capture replay, there is no inspection of the protocol payload. Thus, it will be seen that the termination host applications have no way of distinguished between the payloads of the three sessions because they all come in through port 80.

According to a further aspect of the invention, prior to loading a PCAP file for replay, unique source ports (SRC Port 01, SRC Port 02, and SRC Port 03) are assigned to each session (Session 01, Session 02, and Session 03). In this manner, the termination applications at Host A can look at the application source port (i.e., SRC Port 01, 02, or 03) to determine which payloads belong to a particular session.

Thus, because each payload has its own port, it is not necessary for the capture-replay to be content aware. When the packet is replayed, the source ports are used and matched, even though all of the ports may originally have been sent to the same port.

5. General Technique

Figure 15:
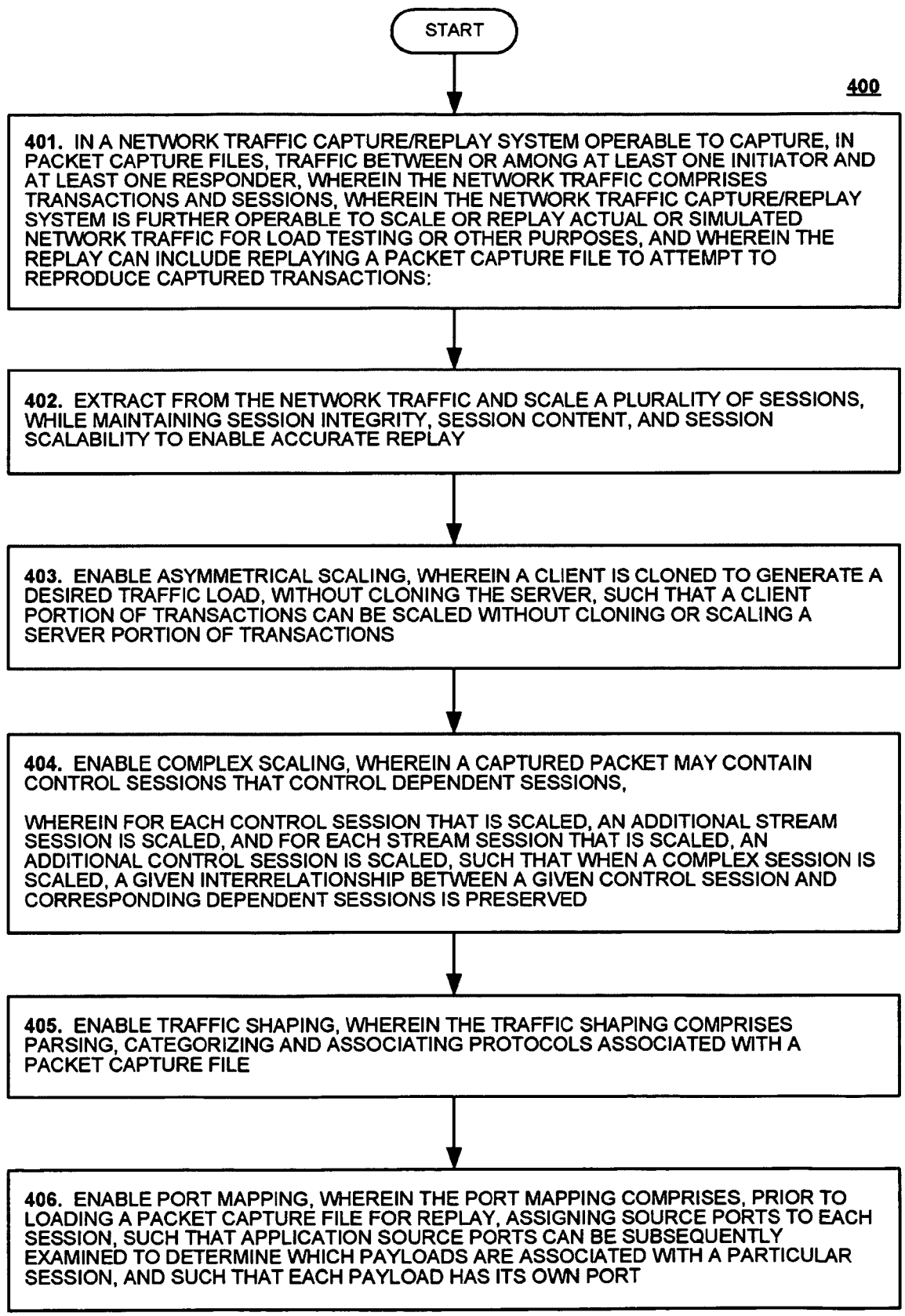
FIG. 15 is a flowchart of a general technique in accordance with the present invention.

FIG. 15 is a flowchart of a general technique 400 in accordance with a practice of the invention.

Box 401 sets forth a general context in which the technique may be practiced, i.e., in a network traffic capture/replay system operable to capture, in packet capture files, traffic between or among at least one initiator and at least one responder, wherein the network traffic comprises transactions and sessions, wherein the network traffic capture/replay system is further operable to scale or replay actual or simulated network traffic for load testing or other purposes, and wherein the replay can include replaying a packet capture file to attempt to reproduce captured transactions.

The technique includes the following aspects:

Box 402: Extracting from the network traffic and scaling a plurality of sessions, while maintaining session integrity, session content, and session scalability to enable accurate replay.

Box 403: Enabling asymmetrical scaling, wherein a client is cloned to generate a desired traffic load, without cloning the server, such that a client portion of transactions can be scaled without cloning or scaling a server portion of transactions.

Box 404: Enabling complex scaling, wherein a captured packet may contain control sessions that control dependent sessions, wherein for each control session that is scaled, an additional stream session is scaled, and for each stream session that is scaled, an additional control session is scaled, such that when a complex session is scaled, a given interrelationship between a given control session and corresponding dependent sessions is preserved.

Box 405: Enabling traffic shaping, wherein the traffic shaping comprises parsing, categorizing and associating protocols associated with a packet capture file.

Box 406: Enabling port mapping, wherein the port mapping comprises, prior to loading a packet capture file for replay, assigning source ports to each session, such that application source ports can be subsequently examined to determine which payloads are associated with a particular session, and such that each payload has its own port.

It will be apparent from the above discussion that the described technique may be practiced with respect to actual and/or simulated network traffic between actual and/or simulated hosts.

6. Digital Processing Environments in which the Invention can be Implemented The following discussion, in connection with FIG. 16 (Prior Art network architecture) and FIG. 17 (Prior Art PC or workstation architecture), describes various digital processing environments in which the present invention may be implemented and practiced, typically using conventional computer hardware elements.

The discussion set forth above in connection with FIGS. 1-15 described methods, structures, systems, and software products in accordance with the invention. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

Figure 16:
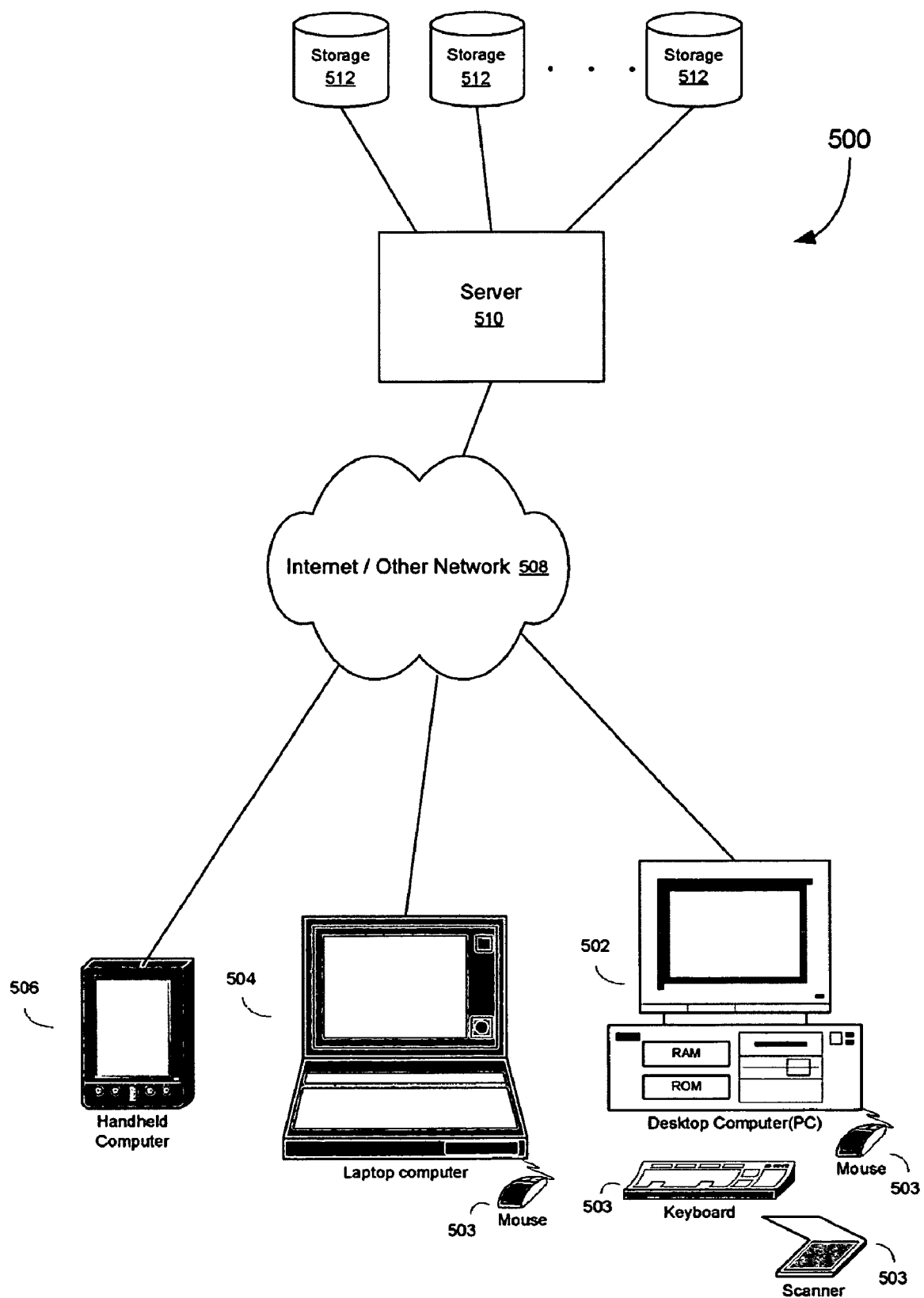
FIGS. 16 and 17 are schematic block diagrams of conventional digital processing systems in which the invention can be implemented.

As an example, FIG. 16 attached hereto depicts an illustrative digital processing network 500 in which the invention can be implemented. Alternatively, the invention can be practiced in a wide range of computing environments and digital processing architectures, whether standalone, networked, portable or fixed, including conventional PCs 502, laptops 504, handheld or mobile computers 506, or across the Internet or other networks 508, which may in turn include servers 510 and storage 512, as shown in FIG. 16.

Figure 17:
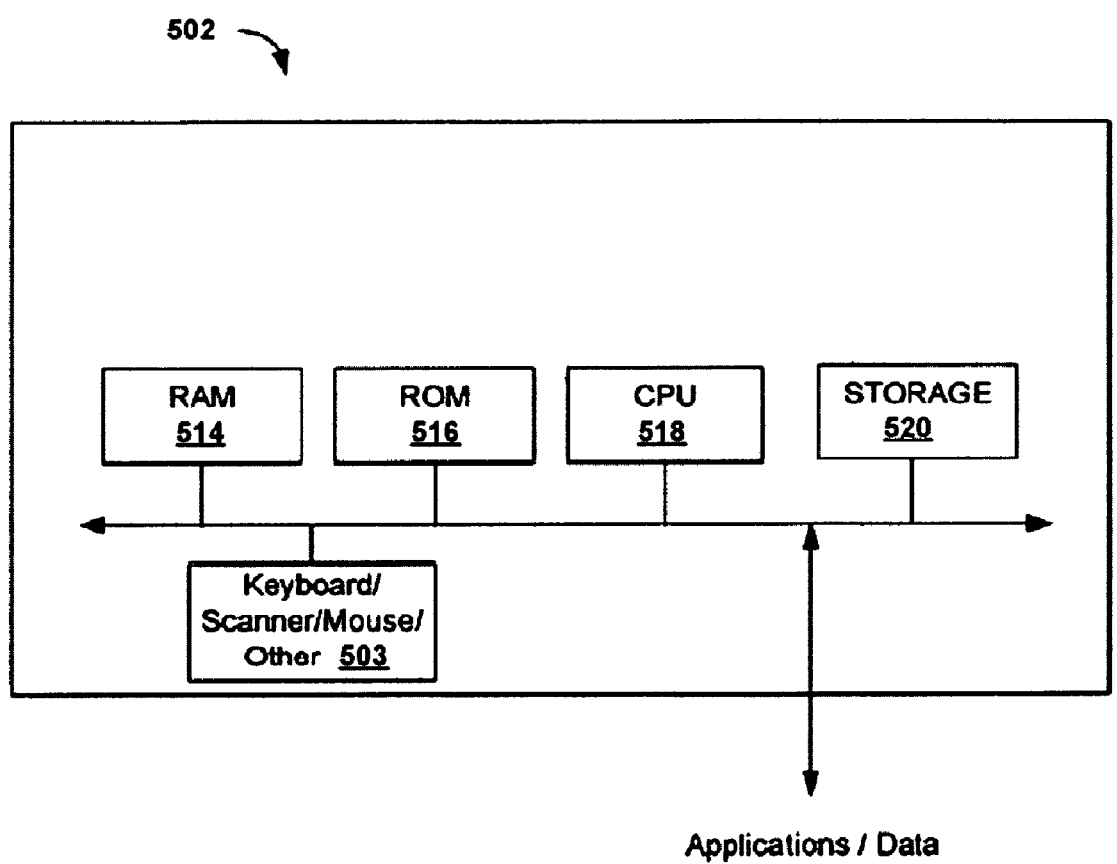

As is well known in conventional computer software and hardware practice, a software application configured in accordance with the invention can operate within, e.g., a PC or workstation 502 like that depicted schematically in FIG. 17, in which program instructions can be read from CD ROM 516, magnetic disk or other storage 520 and loaded into RAM 514 for execution by CPU 518. Data can be input into the system via any known device or means, including a conventional keyboard, scanner, mouse or other elements 503.

Those skilled in the art will understand that various method aspects of the invention described herein can also be executed in hardware elements, such as an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation of Santa Clara, Calif. The actual semiconductor elements of such ASICs and equivalent integrated circuits are not part of the present invention, and are not be discussed in detail herein.

Those skilled in the art will also understand that method aspects of the present invention can be carried out within commercially available digital processing systems, 15 such as workstations and PCs as depicted in FIG. 17, operating under the collective command of the workstation or PC's operating system and a computer program product configured in accordance with the present invention. The term "computer program product" can encompass any set of computer-readable programs instructions encoded on a computer readable medium. A computer readable storage medium can encompass any 20 form of computer readable element, including, but not limited to, a computer hard disk, computer floppy disk, computer-readable flash drive, computer-readable RAM or ROM element. The computer readable medium can also include any other known means of encoding, storing or providing digital information, whether local to or remote from the workstation, PC or other digital processing device or system. Various forms of computer readable elements and media 25 are well known in the computing arts, and their selection is left to the implementer.

Those skilled in the art will also appreciate that a wide range of modifications and variations of the present invention are possible and within the scope of the invention. The invention can also be employed for purposes, and in devices and systems, other than those described herein. Accordingly, the foregoing is presented solely by way of example, and the scope of the invention is not to be limited by the foregoing examples, but is limited solely by the scope of the following patent claims.

We claim:

1. In a network traffic capture/replay system operable to capture, in packet capture files, traffic between or among at least one initiator and at least one responder, wherein the network traffic comprises transactions and sessions, wherein the network traffic capture/replay system is further operable to scale or replay actual or simulated network traffic for load testing or other purposes, a method comprising:

extracting from the network traffic and scaling a plurality of sessions, while maintaining session integrity, session content, and session scalability to enable accurate replay, enabling asymmetrical scaling, wherein a client is cloned to generate a desired traffic load, without cloning the server, to enable scaling of a client portion of transactions without cloning or scaling a server portion of transactions, enabling complex scaling, wherein a captured packet contains control sessions that control dependent sessions, wherein for each control session that is scaled, an additional stream session is scaled, and for each stream session that is scaled, an additional control session is scaled, such that when a complex session is scaled, a given interrelationship between a given control session and corresponding dependent sessions is preserved, enabling traffic shaping, wherein the traffic shaping comprises parsing, categorizing and associating protocols associated with a packet capture file, and enabling port mapping, wherein the port mapping comprises, prior to loading a packet capture file for replay, assigning source ports to each session, to enable application source ports to be subsequently examined to determine which payloads are associated with a particular session, and such that each payload has its own port.

2. A network traffic capture/replay system operable to capture, in packet capture files, traffic between or among at least one initiator and at least one responder, wherein the network traffic comprises transactions and sessions, wherein the network traffic capture/replay system is further operable to scale or replay actual or simulated network traffic for load testing or other purposes, the system comprising:

means for extracting from the network traffic and scaling a plurality of sessions, while maintaining session integrity, session content, and session scalability to enable accurate replay, means for enabling asymmetrical scaling, wherein a client is cloned to generate a desired traffic load without cloning the server, to enable scaling of a client portion of transactions without cloning or scaling a server portion of transactions, means for enabling complex scaling, wherein a captured packet contains control sessions that control dependent sessions, wherein for each control session that is scaled, an additional stream session is scaled, and for each stream session that is scaled, an additional control session is scaled, such that when a complex session is scaled, a given interrelationship between a given control session and corresponding dependent sessions is preserved, means for enabling traffic shaping, wherein the traffic shaping comprises parsing, categorizing and associating protocols associated with a packet capture file, and means for enabling port mapping, wherein the port mapping comprises, prior to loading a packet capture file for replay, assigning source ports to each session, to enable application source ports to be subsequently examined to determine which payloads are associated with a particular session, and such that each payload has its own port.

3. A computer program code product executable in a network traffic capture/replay system comprising at least one computer that is operable to capture, in packet capture files, traffic between or among at least one initiator and at least one responder, wherein the network traffic comprises transactions and sessions, wherein the network traffic capture/replay system is further operable to scale or replay actual or simulated network traffic for load testing or other purposes, the computer program code product comprising computer-readable computer program code stored on a computer-readable storage medium, the computer program code product further comprising:

computer program code means executable by the computer to enable the computer to extract from the network traffic and scaling a plurality of sessions, while maintaining session integrity, session content and session scalability to enable accurate replay, computer program code means for enabling the computer to execute asymmetrical scaling, wherein a client is cloned to generate a desired traffic load, without cloning the server, to enable scaling of a client portion of transactions without cloning or scaling a server portion of transactions, computer program code means executable by the computer to enable the computer to execute complex scaling, wherein a captured packet contains control sessions that control dependent sessions, wherein for each control session that is scaled, an additional stream session is scaled, and for each stream session that is scaled, an additional control session is scaled, such that when a complex session is scaled, a given interrelationship between a given control session and corresponding dependent sessions is preserved, computer program code means executable by the computer to enable the computer to execute traffic shaping, wherein the traffic shaping comprises parsing, categorizing and associating protocols associated with a packet capture file, and computer program code means executable by the computer to enable the computer to execute port mapping, wherein the port mapping comprises, prior to loading a packet capture file for replay, assigning source ports to each session, to enable application source ports to be subsequently examined to determine which payloads are associated with a particular session, and such that each payload has its own port.

* * * * *